(12) United States Patent
Chong

(10) Patent No.: US 11,651,188 B1
(45) Date of Patent: May 16, 2023

(54) BIOLOGICAL COMPUTING PLATFORM

(71) Applicant: CCLabs Pty Ltd, Melbourne (AU)

(72) Inventor: Hon Weng Chong, Toorak (AU)

(73) Assignee: CCLabs Pty Ltd, Melbourne (AU)

( * ) Notice: Subject to any disclaimer, the term of this patent is extended or adjusted under 35 U.S.C. 154(b) by 643 days.

(21) Appl. No.: 16/689,941

(22) Filed: Nov. 20, 2019

Related U.S. Application Data

(60) Provisional application No. 62/770,609, filed on Nov. 21, 2018.

(51) Int. Cl.
| | |
|---|---|
| *G06N 3/00* | (2023.01) |
| *G06N 3/063* | (2023.01) |
| *G06T 7/00* | (2017.01) |
| *G06N 20/10* | (2019.01) |
| *G06N 3/08* | (2023.01) |

(52) U.S. Cl.
CPC .............. *G06N 3/002* (2013.01); *G06N 3/063* (2013.01); *G06N 3/08* (2013.01); *G06N 20/10* (2019.01); *G06T 7/0002* (2013.01)

(58) Field of Classification Search
CPC .......... G06N 3/002; G06N 3/063; G06N 3/08; G06N 20/10; G06T 7/0002
See application file for complete search history.

(56) References Cited

U.S. PATENT DOCUMENTS

| | | | |
|---|---|---|---|
| 5,459,069 A | 10/1995 | Palsson | |
| 6,667,172 B2 | 12/2003 | Janigro | |
| 6,875,605 B1 | 4/2005 | Ma | |
| 9,861,810 B2 * | 1/2018 | Anikeeva | A61N 1/0529 |
| 2001/0024821 A1 | 9/2001 | Potter | |
| 2004/0131998 A1 * | 7/2004 | Marom | A61N 1/3603 607/45 |
| 2006/0019385 A1 | 1/2006 | Smith | |

(Continued)

FOREIGN PATENT DOCUMENTS

WO 2008124229 A2 10/2008

OTHER PUBLICATIONS

Jimbo, Y., et al., "Strengthening of Synchronized Activity by Tetanic Stimulation in Cortical Cultures: Application of Planar Electrode Arrays,"IEEE Transactions on Biomedical Engineering, vol. 45, No. 11, Nov. 1998, pp. 1297-1304.*

(Continued)

*Primary Examiner* — Xuemei G Chen
(74) *Attorney, Agent, or Firm* — Lowenstein Sandler LLP

(57) ABSTRACT

A biological computing platform may include a multielectrode array (MEA) connected to a computing device. The MEA may include a 2D grid of excitation sites, biological neurons disposed on the MEA, a processing device to apply a plurality of impulses at excitation sites having coordinates on the 2D grid, and one or more sensors to measure electrical signals output by one or more of the biological neurons at coordinates of the 2D grid, wherein the processing device is to receive the electrical signals from the one or more sensors and generate a representation of the electrical signals. The computing device may be programmed to receive a digital input signal, convert the digital input signal into instructions for the plurality of impulses, send the instructions to the MEA, receive the representation of the electrical signals from the MEA, and process the representation of the electrical signals.

19 Claims, 5 Drawing Sheets

(56) References Cited

U.S. PATENT DOCUMENTS

| | | | | |
|---|---|---|---|---|
| 2006/0094001 | A1* | 5/2006 | Torre | G06N 3/061 382/128 |
| 2013/0096922 | A1* | 4/2013 | Asaei | G10L 21/0308 704/E11.001 |
| 2014/0107446 | A1* | 4/2014 | Tolosa | A61B 5/1468 427/2.12 |
| 2014/0222103 | A1* | 8/2014 | Lauritzen | A61N 1/37518 607/54 |
| 2014/0279772 | A1* | 9/2014 | Pennewitz | E21B 41/00 706/15 |
| 2014/0287451 | A1 | 9/2014 | McFetridge | |
| 2015/0118745 | A1 | 4/2015 | Iwamoto | |
| 2015/0276707 | A1* | 10/2015 | Lynch | G01N 33/4836 435/287.1 |
| 2016/0116459 | A1* | 4/2016 | Mangan | G01N 33/4836 506/10 |
| 2017/0087766 | A1* | 3/2017 | Chung | B29C 64/129 |
| 2017/0192793 | A1* | 7/2017 | Chilimbi | G06F 9/3802 |
| 2017/0316311 | A1* | 11/2017 | Pilly | G06N 3/0454 |
| 2017/0337473 | A1* | 11/2017 | Bernert | G06N 3/049 |
| 2018/0101742 | A1* | 4/2018 | Burge | G06V 40/161 |
| 2018/0149639 | A1* | 5/2018 | Pan | G01N 33/5058 |
| 2018/0169403 | A1* | 6/2018 | Park | A61N 1/0536 |
| 2019/0034111 | A1* | 1/2019 | Catthoor | G11C 16/04 |
| 2019/0087713 | A1* | 3/2019 | Lamb | G06N 3/084 |
| 2020/0055041 | A1* | 2/2020 | Kim | G01N 33/4836 |
| 2021/0143965 | A1* | 5/2021 | Perotti | H04L 1/0057 |
| 2021/0334657 | A1* | 10/2021 | Jordan | G06N 3/002 |

OTHER PUBLICATIONS

Lin, S. et al., "On-Line observation of cell growth in a three-dimensional matrix on surface-modified microelectrode arrays"; Biomaterials; Available online Apr. 3, 2009; pp. 3110-3117; vol. 30 (2009); Elsevier.

* cited by examiner

BIOLOGICAL COMPUTING PLATFORM

RELATED APPLICATIONS

This patent application claims the benefit under 35 U.S.C. § 119(e) of U.S. Provisional Application No. 62/770,609, filed Nov. 21, 2018, which is herein incorporated by reference.

TECHNICAL FIELD

Embodiments of the present invention relate, in general, to a neurological computation and experimentation platform, and in particular to a trainable set of biological neurons that are accessible via a network.

BACKGROUND

Silicon computing performance has approximately doubled every 18 months by shrinking transistor size for the last 50 years following Moore's Law. However, since 2015 performance increase has slowed. Transistors are currently at 10 nm, and further shrinkage is difficult due to quantum effects. In order to continue technological progress, alternative computation technologies need to be developed to replace silicon-based computing and the Von Nuemann architecture.

BRIEF DESCRIPTION OF THE DRAWINGS

The embodiments described herein will be understood more fully from the detailed description given below and from the accompanying drawings, which, however, should not be taken to limit the application to the specific embodiments, but are for explanation and understanding only.

DETAILED DESCRIPTION OF THE PRESENT INVENTION

Figure 1:
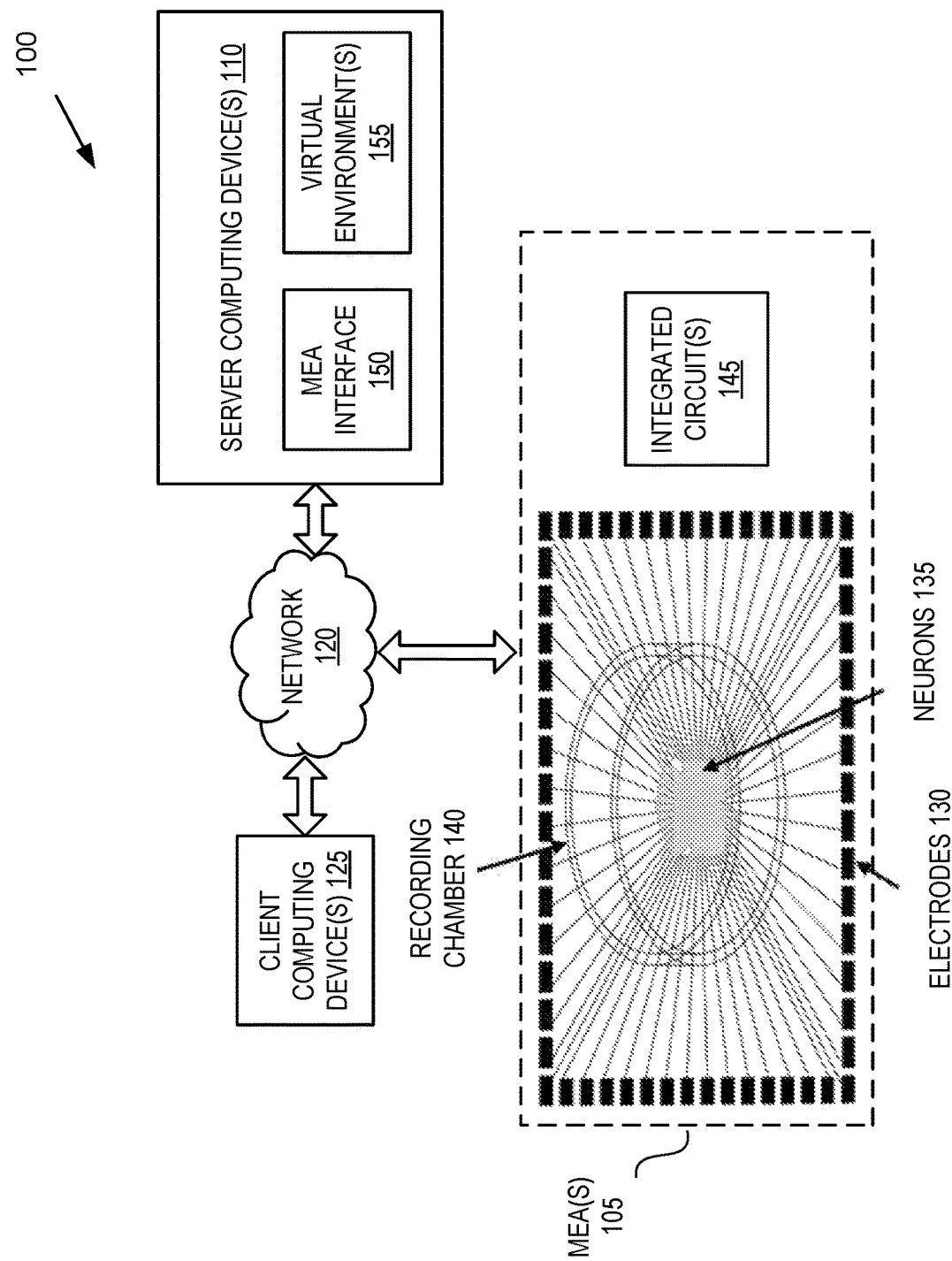
FIG. 1 illustrates an example system architecture for a biological computing platform, in accordance with one embodiment.

Described herein are embodiments of a biological computing platform, which may be implemented as a biological computing research platform (also referred to as a neural computation and experimentation platform). The biological computing platform may be a biological computing cloud platform that provides network access to biological neural networks (e.g., exposes biological neural network resources through the cloud). In one embodiment, the biological computing platform externalizes networks of biological neurons (e.g., cortical neurons) and provides an interface between the biological neural network and a virtual environment executed on a computing device. Accordingly, the biological computing platform creates an efferent (e.g., vision or other input)/efferent (e.g., motor or other output) loop between the biological neural network and the virtual environment.

Biological neurons are near infinitely scalable, energy efficient (especially as compared to silicon based processors), small, and produce very little heat (e.g., as compared to silicon based processors). For example, a biological neural network in a multielectrode array (MEA) or other neural processing unit has an energy use per synapse of about 2E-10 Joules. In contrast, the energy user per transistor in an example silicon processing device is about 2E-7 Joules. Additionally, biological neural networks are fault tolerant, and in many instances can withstand the destruction of half of the biological neural network and still be able to function. Biological neural networks also exhibit neuroplasticity, which enables highly adaptable intelligence that is suitable for many different applications.

The mechanisms that have been developed to encode and decode artificial neural networks are generally inapplicable to biological neural networks. In an artificial neural network, data is frequently encoded as floating point vectors, which is then input into the artificial neural network. The artificial neural networks then generally are trained to output further vectors, which are easily decodable. However, in a biological neural network, data is encoded as spikes of action potentials (e.g., voltage variation across a cell membrane) of a population of biological neurons. There is a need to develop technology that acts an encoder/decoder to generate signals that can be interpreted by biological neural networks and to decode output signals generated by the biological neural networks.

Embodiments provide a biological computing platform that includes a multielectrode array (MEA) connected to a computing device. The computing device may be a physical computing device or a virtual computing device. The computing device may execute an MEA interface that enables the computing device to communicate with the MEA (and with a biological neural network contained within the MEA). The computing device may additionally execute an experiment logic or virtual environment that interfaces with the MEA interface. The MEA interface may receive digital input signals from the experiment logic or virtual environment, convert the digital input signals into instructions for the MEA, and then send the instructions to the MEA. The instructions may cause the MEA to apply a plurality of electrical or optical impulses at excitation sites having coordinates on a 2D grid or other array of excitation sites in the MEA. The MEA interface may additionally receive representations of electrical signals measured at locations on the 2D grid or other array from the MEA, generate responses for the experiment logic or virtual environment based on the representation, and send the responses to the experiment logic or virtual environment. In this manner, the MEA interface enables the virtual environment or experiment logic to interact with the biological neural network on the MEA.

In one embodiment, a biological computing platform includes an MEA connected to a computing device. The MEA may include a two-dimensional (2D) grid of excitation sites, a plurality of biological neurons disposed on the MEA, and a processing device or integrated circuit. Alternatively, the MEA may be a circuitless chip, which may be connected to a processing device or integrated circuit (e.g., via a printed circuit board). The processing device may be a complementary metal-oxide-semiconductor (CMOS) chip. In one embodiment, the processing device is a component of a system on a chip (SoC) that includes a network adapter, an analog to digital converter and/or a digital to analog converter.

The computing device may receive or generate a digital input signal, convert the digital input signal into instructions for the plurality of electrical or optical impulses, and send the instructions to the MEA. The MEA may use a DAC to convert the instructions from a digital form into an analog form, and the processing device of the MEA may apply the plurality of electrical or optical impulses at excitation sites having coordinates on the 2D grid or other array of excitation sites. One or more sensors and/or the processing device may measure electrical signals output by one or more of the plurality of biological neurons at coordinates of the 2D grid or other array. The processing device may then generate a representation of the electrical signals, and may send the representation back to the computing device. The computing device may convert the representation into a response readable by a virtual environment or experiment logic, and may send the response to the experiment logic or virtual environment.

In one embodiment, a method of providing a biological computing platform includes receiving a digital input signal from a processing logic. The method further includes converting the digital input signal into instructions for a plurality of electrical or optical impulses, where each electrical or optical impulse of the plurality of electrical or optical impulses is associated with a two-dimensional (2D) coordinate or three dimensional (3D) coordinate. The method further includes applying the plurality of electrical or optical impulses at specified coordinates of a 2D grid or 3D matrix in a multielectrode array (MEA) in accordance with the instructions, wherein a plurality of biological neurons are disposed on the MEA. The method further includes measuring electrical signals output by one or more of the plurality of biological neurons at one or more additional coordinates of the 2D grid or 3D matrix. The method further includes generating a representation of the one or more electrical signals and sending the representation of the one or more electrical signals to the processing logic.

FIG. 1 illustrates an example system architecture for a biological computing platform 100, in accordance with one embodiment. As shown, the biological computing platform 100 includes one or more MEA 105 connected to one or more server computing devices 110 via a network 120. The network 120 may be a local area network, a wide area network, a private network (e.g., an intranet), a public network (e.g., the Internet), or a combination thereof.

The server computing devices 110 may include physical machines and/or virtual machines hosted by physical machines. The physical machines may be rackmount servers, desktop computers, or other computing devices. In one embodiment, the server computing devices 110 include virtual machines managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

The server computing devices 110 may host an MEA interface 150 and one or more virtual environments 155. The MEA interface 150 and virtual environment(s) 155 may be hosted on the same server computing device 110, or may be hosted on separate server computing devices, which may be connected via the network 120.

An MEA 105 (also known as a microelectrode array) is a device that contains multiple plates or shanks through which neural signals are obtained and/or delivered. The plates or shanks are generally arranged in a grid or other array, and serve as neural interfaces that connect neurons 135 to electronic circuitry. The MEA 105 includes a recording chamber 140 that houses many biological neurons 135 and/or a solution or other medium (e.g., a saline solution). These biological neurons 135 may be cultured neurons (e.g., cultured from stem cells) and/or extracted neurons (e.g., extracted from a rat brain).

Biological neurons create ion currents through their membranes when excited, causing a change in voltage between the inside and the outside of the cell. When recording, the electrodes on an MEA transduce the change in voltage from the environment carried by ions into currents carried by electrons (electronic currents). When stimulating, electrodes may transduce electronic currents into ionic currents through the media. This triggers the voltage-gated ion channels on the membranes of the excitable neurons, causing the neuron to depolarize and trigger an action potential.

The size and shape of a recorded signal may depend upon the nature of the medium (e.g., solution) in which the neuron or neurons are located (e.g. the medium's electrical conductivity, capacitance, and homogeneity), the nature of contact between the neurons and the electrodes (e.g. area of contact and tightness), the nature of the electrodes (e.g. its geometry, impedance, and noise), the analog signal processing (e.g. the system's gain, bandwidth, and behavior outside of cutoff frequencies), and data sampling properties (e.g. sampling rate and digital signal processing). For the recording of a single neuron that partially covers a planar electrode, the voltage at the contact pad is approximately equal to the voltage of the overlapping region of the neuron and electrode multiplied by the ratio the surface area of the overlapping region to the area of the entire electrode. An alternative means of predicting neuron-electrode behavior is by modeling the system using a geometry-based finite element analysis in an attempt to circumvent the limitations of oversimplifying the system in a lumped circuit element diagram.

The MEA(s) 105 can be used to perform electrophysiological experiments on dissociated cell cultures (e.g., cultures of biological neurons). With dissociated neuronal cultures, the neurons spontaneously form biological neural networks. The MEA(s) 105 may include an array of electrodes 130 and the recording chamber 140 that contains a living culture of biological neurons 135 in a saline solution or other solution that will keep the biological neurons alive. The array of electrodes 130 may be a planar array (e.g., a two-dimensional (2D) grid) or a three-dimensional (3D) array (e.g., a 3D matrix). The array of electrodes 130 that may be used to take measurements at 2D coordinates (or 3D coordinates) at high spatial and temporal resolution at excellent signal quality. Additionally, the array of electrodes 130 may be used to apply electrical impulses at the 2D coordinates or 3D coordinates.

One or more of the MEA(s) 105 may be an active MEA that includes an integrated circuit 145 (or multiple integrated circuits), such as a CMOS circuit. The integrated circuit(s) 145 may include processing logic (e.g., a general purpose or special purpose processor), a network adapter, a digital to analog converter (DAC), an analog to digital converter (ADC), and/or other components. The network adapter may be a wired network adapter (e.g., an Ethernet network adapter) or a wireless network adapter (e.g., a Wi-Fi network adapter), and may enable the MEA(s) 105 to connect to network 120. In one embodiment, the integrated circuit 145 includes a processing device, which may be a general purpose processor, a microcontroller, a digital signal processor (DSP), a programmable logic controller (PLC), a microprocessor or programmable logic device such as a field programmable gate array (FPGA) or a complex programmable logic device (CPLD). In one embodiment, the integrated circuit 145 includes a memory, which may be a non-volatile memory (e.g., RAM) and/or a volatile memory (e.g., ROM, Flash, etc.). In one embodiment, the integrated circuit 145 is a system on a chip (SoC) that includes the processing device, memory, network adapter, DAC, and/or ADC.

In one embodiment, one or more of the MEA(s) 105 is a passive MEA that is connected to one or more integrated circuits 145 via one or more leads and/or a printed circuit board (PCB).

In one embodiment, one or more of the MEAs 105 further includes an optical source that is capable of providing optical impulses to specified 2D coordinates in the 2D grid. The optical source may include light emitting elements (e.g., light emitting diodes (LEDs), light bulbs, lasers, etc.) that are capable of emitting light having one or more specified wavelengths. Accordingly, optogenics may be used to manipulate neural activity. Additionally, lasers of specific wavelengths may be used for highly accurate targeting of specific neurons. The response to optical stimulation may then be measured by the electrodes in the MEA(s) 105. Unlike electrical stimulation, light stimulation manipulates specific cells (e.g., neurons) that may express a targeted opsin protein, thereby making it possible to investigate the role of a subpopulation of neurons in a neural circuit. In some embodiments, immunofluorescence of specifically modified calcium that get cleaved and activated when they enter the neurons can also be paired with a camera to image activation of neurons.

In the case of an active MEA 105, on-chip signal multiplexing may be used to provide a large number of electrodes to achieve a high spatio-temporal resolution in recording of electrical signals and providing of electrical impulses. Moreover, weak neuronal signals can be conditioned right at the electrodes by dedicated circuitry units, which provide a large signal-to-noise ratio. Finally, analog-to-digital conversion may performed on chip, so that stable, digital signals are generated.

The MEA interface 150 may be responsible for translating between inputs/outputs of the virtual environment(s) 155 and the inputs/outputs of the MEA(s) 105. Each virtual environment 155 may include some processing logic that may receive inputs from one or more MEAs 105 and/or an external source, and that may generate outputs. One example of processing logic of a virtual environment is a machine learning model such as an artificial neural network, deep neural network, convolutional neural network, recurrent neural network, etc. Other machine learning models included in virtual environments may apply a k-nearest neighbors algorithm, a learning vector quantization, a self-organizing map, regression analysis, a regularization algorithm, and so on. Another example of processing logic of a virtual environment is an application executing on the server computing device. For example, the application may be a game (e.g., Pong), and the biological neurons 135 on the MEA 105 may be trained to play the game.

The server computing device 110 may provide one or more application programming interfaces (APIs) that enable third parties to upload virtual environments 155 and connect those virtual environments 155 to one or more MEAs 105. Each virtual environment 155 may be assigned one or more MEAs 105, and may train the neurons 135 on those MEAs 105 to perform some task, as discussed in greater detail below. Each virtual environment 155 may be assigned a virtual environment identifier (ID), and each MEA 105 may be assigned an MEA ID. Virtual environment IDs may be associated with MEA IDs 105 in a database or other data store, which may be maintained by the server computing device(s) 110.

Once a virtual environment 155 is paired with an MEA 105, that virtual environment may begin proving digital input signals for the MEA 105. The virtual environment 155 may generate a digital input signal, which may be, for example, a vector (e.g., a sparse vector and/or floating point vector), a message complying with some communication protocol, or a 2D or 3D matrix of values. The MEA interface 150 may include information on the array of electrodes 130 of the MEA 105. This may include information on the number of electrodes 130 and how the electrodes 130 are arranged in the recording chamber 140 (e.g., for a 2D grid of electrodes, the number or rows and columns of electrodes). The MEA interface 150 may convert the digital input signal from the virtual environment 155 into instructions for one or more electrical or optical impulses, where each electrical or optical impulse instruction is associated with a 2D coordinate or a 3D coordinate. Each electrical or optical impulse instruction may further include information on an amplitude or intensity of the impulse to apply, a frequency or wavelength of the impulse to apply and/or a current of the impulse to apply. Accordingly, the information for each impulse may be a tuple that includes one or more of (x coordinate, y coordinate, z coordinate, intensity/amplitude, frequency/wavelength, current).

Once the MEA interface 150 converts the digital input signal from the virtual environment into information for one or more optical or electrical impulses, it sends the information to the appropriate MEA 105. An integrated circuit 145 of the MEA 105 then converts the information into one or more analog signals for the optical or electrical impulses (e.g., using a DAC), and applies the one or more analog signals to appropriate electrodes 130 (or light emitting elements) to apply the optical or electrical impulses at the specified coordinates and/or with the specified intensity/amplitude, frequency/wavelength, and so on.

In response to the application of the electrical or optical impulses at the specified coordinates, one or more of the biological neurons 135 in the biological neural network in the recording chamber 140 will generate an electrical signal. The electrodes 130 may be used as sensors to measure these electrical signals that may occur at various coordinates within the array (e.g., the 2D or 3D grid of electrodes 130). For example, the integrated circuit 145 (e.g., a CMOS chip) may read electrical impulses received at the electrodes 130. Alternatively, separate sensors may be arranged in the recording chamber 140. The electrical signals output by the neurons 135 may be measured, and their coordinates may be associated with the measurements. Other information such as amplitude (e.g., voltage), current and/or frequency may also be measured. The integrated circuit 145 may then generate a digital representation of the one or more measured electrical signals (e.g., using a ADC). This digital representation may then be sent from the MEA 105 to the MEA interface 150.

In one embodiment, one or more cameras are used to measure activated neurons. Specifically modified calcium may be used to cause the neurons to fluoresce under particular circumstances. The calcium may be cleaved and activated when it enters a neuron (which may happen when a neuron or pair of neurons is activated). The cleaving of the calcium may cause it to exhibit immunofluorescence. The one or more cameras can detect the fluorescence and determine a location that the fluorescence occurred. Alternatively, the MEA or computing device can receive the image from the camera and determine where the fluorescence occurred. In particular, the MEA or computing device may determine coordinates of where light was measured from the image. The MEA or computing device may then generate a digital representation of the locations at which light was detected (e.g., locations that exhibited immunofluorescence).

The MEA interface 150 may then generate a response message based on the digital representation received from the MEA 105. Generating the response message may include converting the representation into a format that is readable by the virtual environment 155. This may include converting the representation (e.g., which may be in the form of a matrix of values representing electrical signals at various coordinates) into a sparse vector in one embodiment. The MEA interface 150 may then send the response message to the virtual environment 155.

The virtual environment 155 may process the response message, and based on the processing may determine whether the electrical signals output by the neurons 135 correspond to a target set by the virtual environment 155. The target may be unknown to the MEA interface 150 and/or MEA 105. If the electrical signals corresponded to the target, then the virtual environment 155 may use an API of the MEA interface 150 to send a training signal to the MEA interface 150. The training signal indicates that electrical signals output by the neurons 135 in response to the digital input signal satisfied some criterion of the virtual environment 155 (e.g., indicates that some target objective of the virtual environment was satisfied by the representation of the one or more electrical signals).

Responsive to receiving the training signal, MEA interface 150 may determine an electrical or chemical reward stimulus for the biological neurons 135 and/or may send an instruction to the MEA 105 to output the electrical or chemical reward stimulus. The integrated circuit 145 may receive the instruction to output the electrical or chemical reward stimulus, and may then cause the electrical or chemical reward stimulus to be output to the biological neurons 135.

In one embodiment, the reward stimulus is an electrical reward stimulus that may be delivered via the array of electrodes 130. For example, the reward stimulus may be an electrical impulse having a delta waveform. The electrical impulse having the delta waveform may be applied at multiple electrodes (e.g., at all of the electrodes in some embodiments) to deliver the electrical impulse to multiple locations in the array (e.g., in the 2D or 3D grid) to provide a deltoid stimulation to the biological neurons 135.

In one embodiment, the reward stimulus is a chemical reward stimulus. The MEA 105 may further include or be connected to one or more light sources that can emit light of a particular wavelength. These light sources can be activated by the integrated circuit 145 in embodiments. Additionally, the recording chamber 140 may include a protein disposed therein that is sensitive to the particular wavelength of light. The protein (e.g., an opsin protein) may be bound with dopamine. When the protein is exposed to the particular wavelength of light, the protein may release some amount of the bound dopamine.

In one embodiment, the reward stimulus includes tetanic stimulation of one or more neurons. A tetanic stimulation includes a high-frequency sequence of individual stimulations of a neuron (or group of neurons). High-frequency stimulation causes an increase in release called post-tetanic potentiation. The presynaptic event is caused by calcium influx. Calcium-protein interactions then produce a change in vesicle exocytosis. The result of such changes causes the postsynaptic neuron to be more likely to fire an action potential.

The chemical reward stimulus, electrical reward stimulus and tetanic stimulation form of reward stimulus all provide a form of reinforcement learning for the biological neurons 135. The biological neurons 135 are rewarded when they generate electrical signals that satisfy some criteria of the virtual environment 155, and over time will learn what the targets are and learn how to achieve those targets. The biological neurons 135 may be self-organizing, and may form connections to achieve the targets. In one embodiment, with each success of the biological neurons 135, the chemical or electrical reward stimulus is reduced (e.g., the amount of dopamine released is reduced). In one embodiment, the neurons 135 may learn via Hebbian learning. For example, if two neurons fire together to make something happen and are rewarded, then the next time it takes less activation or voltage to get those two neurons to fire again, thus increasing the frequency of this happening.

The digital input signal, instructions for electrical or optical impulses, representation of electrical signals and/or response messages may be stored in a data store (e.g., for study and/or analysis). Researchers from around the world may access the stored data and/or the virtual environment for study via client computing device 125 connected to the network 120. For example, a researcher may develop an artificial or virtual environment 155 (e.g., a game), run an experiment that applies the game to the neurons 135, and receive data from the experiment. The data from the experiment may then be available to the researcher and/or other researchers via the cloud.

In one embodiment, the server computing device 110 further includes an artificial neural network (e.g., that may be external to virtual environment 155). The artificial neural network may be trained in parallel with the biological neural network comprising the neurons 135. For example, the digital input signal may be input into the artificial neural network, and a target associated with the digital input signal may be provided to the artificial neural network. The artificial neural network may be trained (e.g., using back propagation) at the same time that the biological neural network is trained.

Figure 2:
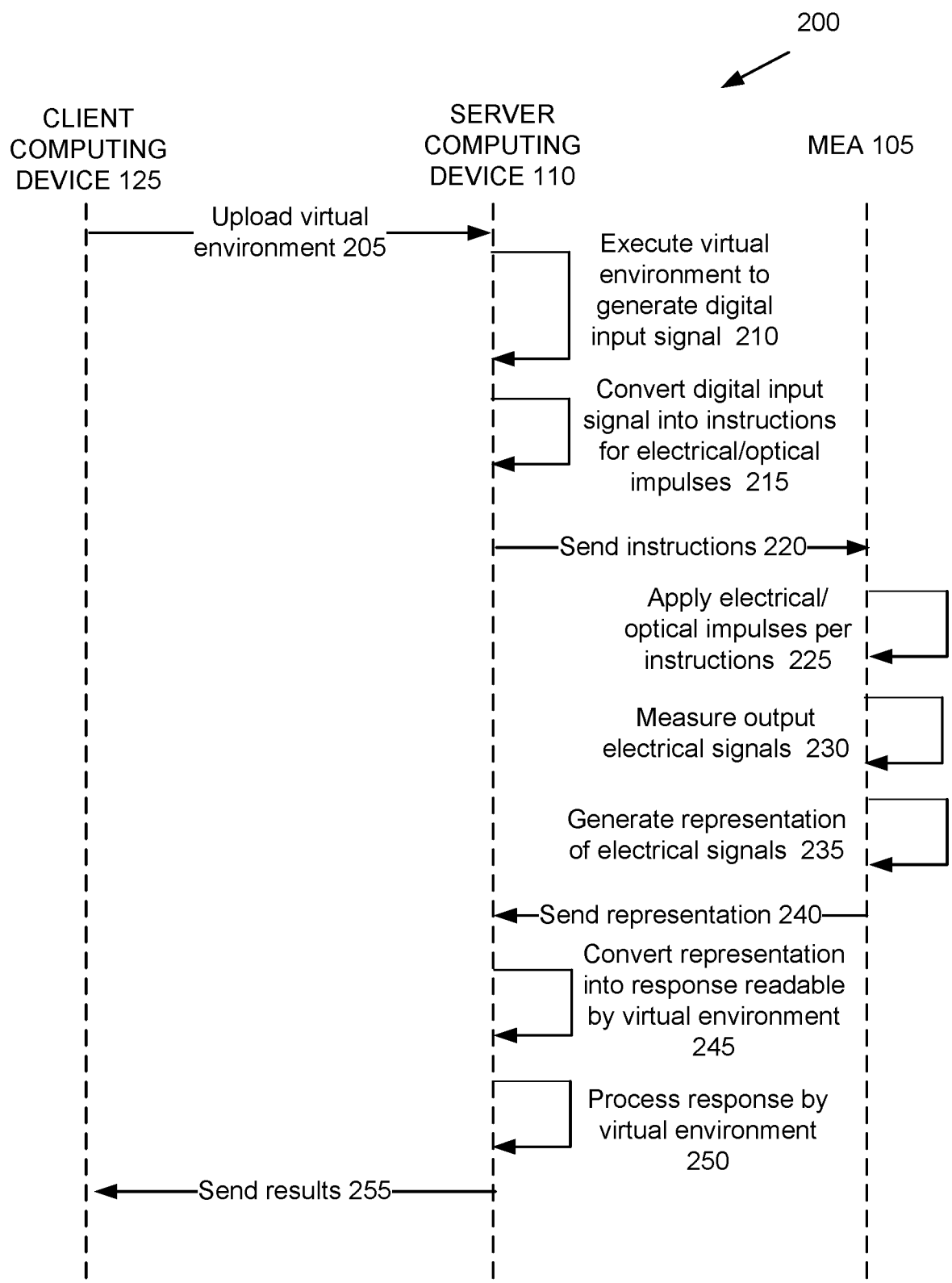
FIG. 2 is a sequence diagram illustrating one embodiment for a method of using a biological computing platform.
Figure 3:
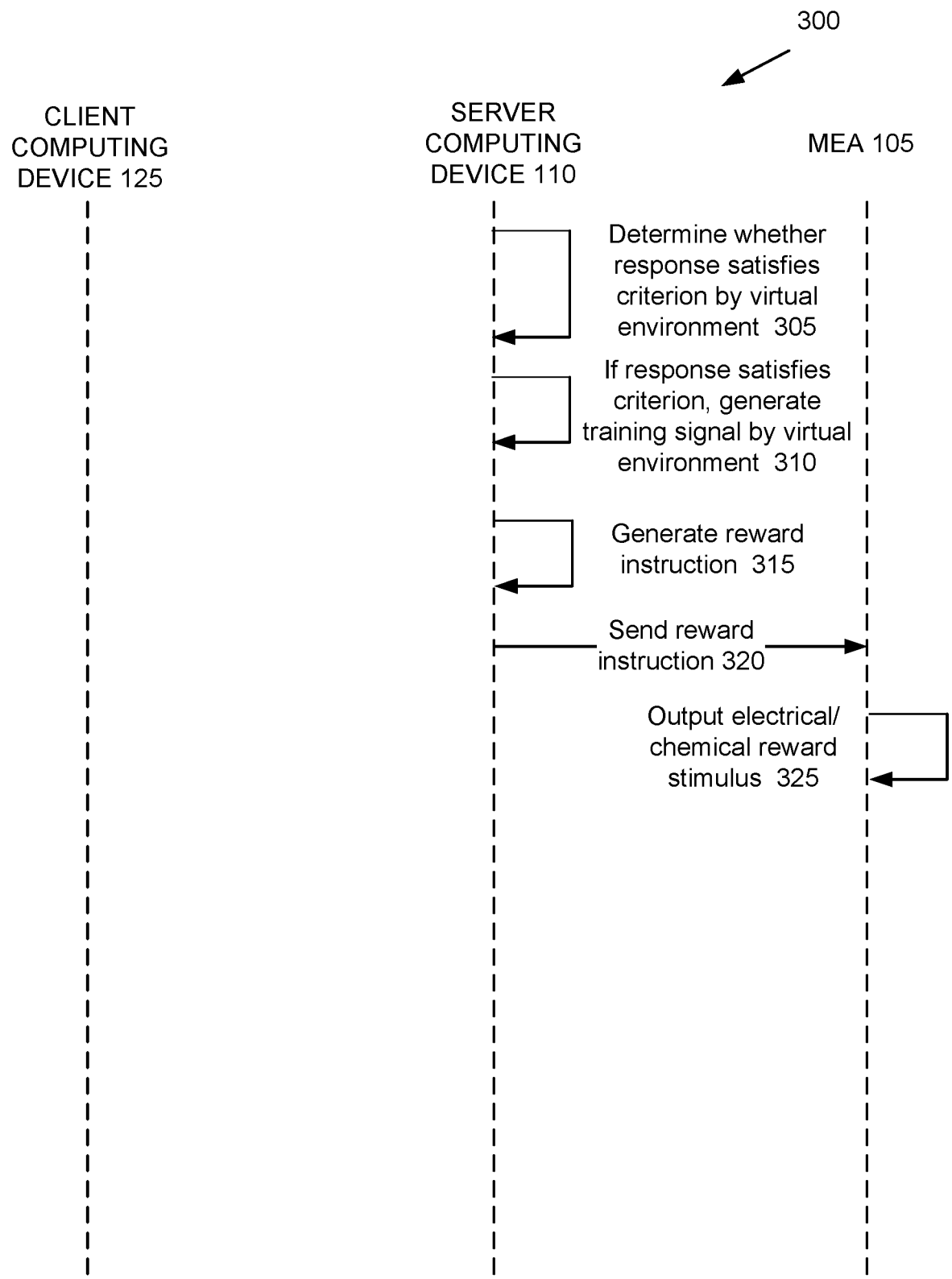
FIG. 3 is a sequence diagram illustrating one embodiment for a method of providing reinforcement learning to biological neurons in a biological computing platform.
Figure 4:
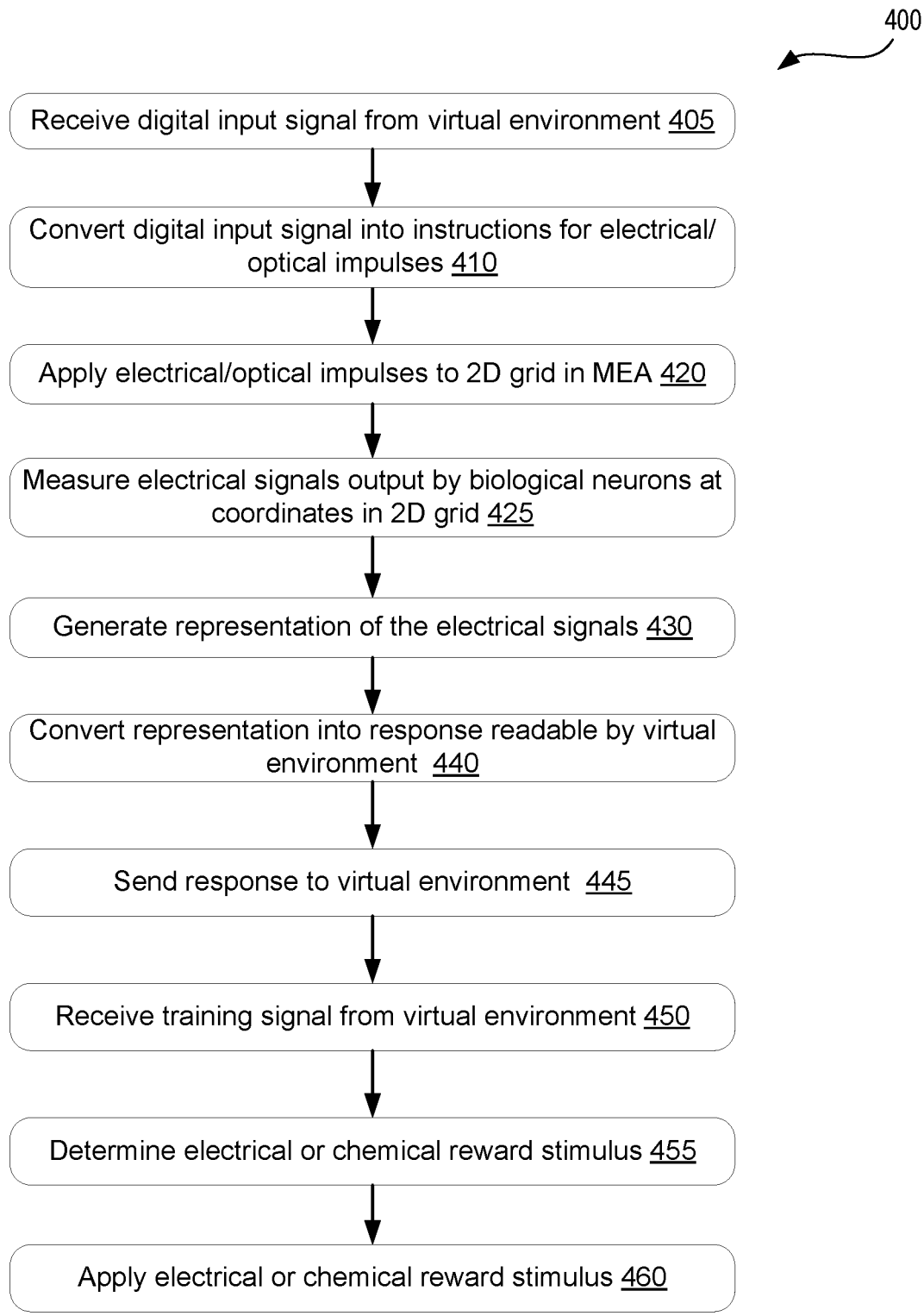
FIG. 4 is a flow diagram illustrating one embodiment for a method of using a biological computing platform.

FIGS. 2-4 are flow diagrams and sequence diagrams illustrating methods of providing a biological computing platform. These methods may be performed by processing logic of a server computing device as well as processing logic of an MEA, each of which may include hardware (e.g., circuitry, dedicated logic, programmable logic, microcode, etc.), software (such as instructions run on a processing device, a general purpose computer system, or a dedicated machine), firmware, or a combination thereof. The methods may be performed by an MEA and/or a server computing device. For example, some operations may be performed by an MEA and other operations may be performed by a computing device.

For simplicity of explanation, the methods are depicted and described as a series of acts. However, acts in accordance with this disclosure can occur in various orders and/or concurrently and with other acts not presented and described herein. Furthermore, not all illustrated acts may be performed to implement the methods in accordance with the disclosed subject matter. In addition, those skilled in the art will understand and appreciate that the methods could alternatively be represented as a series of interrelated states via a state diagram or events.

FIG. 2 is a sequence diagram illustrating one embodiment for a method 200 of using a biological computing platform. A client computing device 125 may upload 205 a virtual environment (also referred to as an artificial environment or experiment logic) to a server computing device 110. The server computing device 110 may then execute the virtual environment at block 210, and the virtual environment may generate a digital input signal. An MEA interface executing on the server computing device 110 may receive the digital input signal and convert it into instructions for electrical or optical impulses at block 215. The server computing device 110 may then send 220 the instructions to an MEA 105. In some embodiments, the digital input signal is readable by an integrated circuit (e.g., a processing device) of the MEA 105, and no conversion is performed at block 215. In such embodiments, the digital input signal may be sent to the MEA 105 and processed by the MEA at block 220.

The MEA 105 may generate one or more analog optical or electrical impulses (input signals) based on the instructions (or based on the digital input signal). The signals may be applied at specific electrodes that have specific locations (e.g., x,y coordinates or x,y,z coordinates) at block 225. At block 230, the MEA 105 may then measure output electrical signals generated by biological neurons of a biological neural network in the MEA 105. The MEA may then generate a representation of the electrical signals at block 235. This may include using an analog to digital converter to convert the analog electrical signals into digital values.

At block 240, the MEA sends the representation of the measured electrical signals output by the neurons to the server computing device. At block 245, the MEA interface on the server computing device may convert the representation into a response message for the virtual environment that is readable by processing logic of the virtual environment. The MEA interface may then send the response message to the virtual environment. At block 250, the virtual environment may then process the response message. In some embodiments, the representation of the electrical signals is readable by the virtual environment, and no conversion is performed at block 245. In such embodiments, the representation may be sent to the virtual environment and processed by the virtual environment. The virtual environment may then generated results, which the server computing device 110 may send to the client computing device 125.

In embodiments, the blocks 210-250 form a loop that is continuously run until some stop signal is applied. For example, after the operations of block 250 are completed, the method may return to block 210, and the operations of block 210 may be repeated.

FIG. 3 is a sequence diagram illustrating one embodiment for a method 300 of providing reinforcement learning to biological neurons in a biological computing platform. Method 300 may be performed after method 200 is completed. At block 305, the virtual environment executing on the server computing device 110 determines whether a response message (or representation of electrical signals output by neurons on the MEA 105) satisfies some criterion. If the response message (or representation of electrical signals) satisfies the criterion, then the virtual environment generates a training signal and provides the training signal to the MEA interface executing on the server computing device 110. The MEA interface may then generate a reward instruction (block 315) and send the reward instruction to MEA 105 (block 320). Alternatively, the MEA interface may forward the training signal to the MEA 105. At block 325, the MEA may then output an electrical or chemical reward stimulus to the biological neural network on the MEA 105.

In one example, the virtual environment includes a video game such as Pong. In such an embodiment, the digital input signal may be a projection of the game world (e.g., a frame of a display or user interface of the game). In one embodiment, the projection of the game world is a mapping of the pixels of the display for the game at a given point in time. Each pixel in the display may be associated with a location in a 2D grid of electrodes on the MEA 105. Depending on the resolution of the display and a number of rows and columns in the 2D grid of electrodes, there may be a 1 to 1 mapping between pixels of the display and electrodes in the MEA, a 1 to X mapping or an X to 1 mapping, where X is a positive integer. An MEA interface running on the server computing device 110 may determine a mapping between the pixels of the display for the game and the 2D grid in the MEA 105. For example, x,y pixel 1,3 may map to an electrode at column 2, row 6 of the 2D grid. In one embodiment, converting the digital input signal at block 215 includes determining, for each location of the 2D grid, whether the location is to be activated (with an impulse sent to the electrode at the location) or deactivated (with no impulse sent to the electrode at the location). Accordingly, the electrical or optical signals may be applied at the specified activated locations. In the example of Pong, the instructions for electrical/optical impulses may represent a court, a position of a ball and positions of paddles in the court.

In the above example the biological neural network may be trained to move the paddle to intercept the ball. This may be achieved by demarcating the 2D grid in the MEA 105 into 4 quadrants. With each set of electrical/optical impulses that are applied to the biological neural network, the electrical signals generated by the neurons may be measured. If a majority of electrical signals measured are from an upper right quadrant, then this may cause the virtual environment to move the right paddle up. If a majority of electrical signals measured are from a lower right quadrant, then this may cause the virtual environment to move the right paddle down. A positive reward stimulus may then be provided to the biological neural network when the ball intercepts the right paddle, as discussed above.

FIG. 4 is a flow diagram illustrating one embodiment for a method 400 of using a biological computing platform. At block 405, a computing device receives a digital input signal from a virtual environment. At block 410, the computing device converts the digital input signal into instructions for electrical/optical impulses. At block 420, the computing device provides the instructions to an MEA, which applies the electrical/optical impulses to an array of electrodes (e.g., a 2D grid or 3D matrix of electrodes).

At block 425, the MEA measures electrical signals output by biological neurons at coordinates of the array (e.g., at coordinates of the 2D grid or 3D matrix). The electrical signals may be analog signals. At block 430, the MEA may generate a digital representation of the electrical signals. At block 440, the MEA may send the digital representation to the computing device, which may convert the digital representation into a response message for the virtual environment. At block 445, the computing device may provide the response message to the virtual environment.

At block 450, the computing device may receive a training signal from the virtual environment. At block 455, the computing device may determine an electrical or chemical reward stimulus and instruct the MEA to apply the electrical or reward stimulus. Alternatively, the computing device may forward the training signal to the MEA. At block 460, the MEA then applies the electrical or reward stimulus to the biological neurons. This process may continue, and in turn a biological neural network may be trained.

Figure 5:
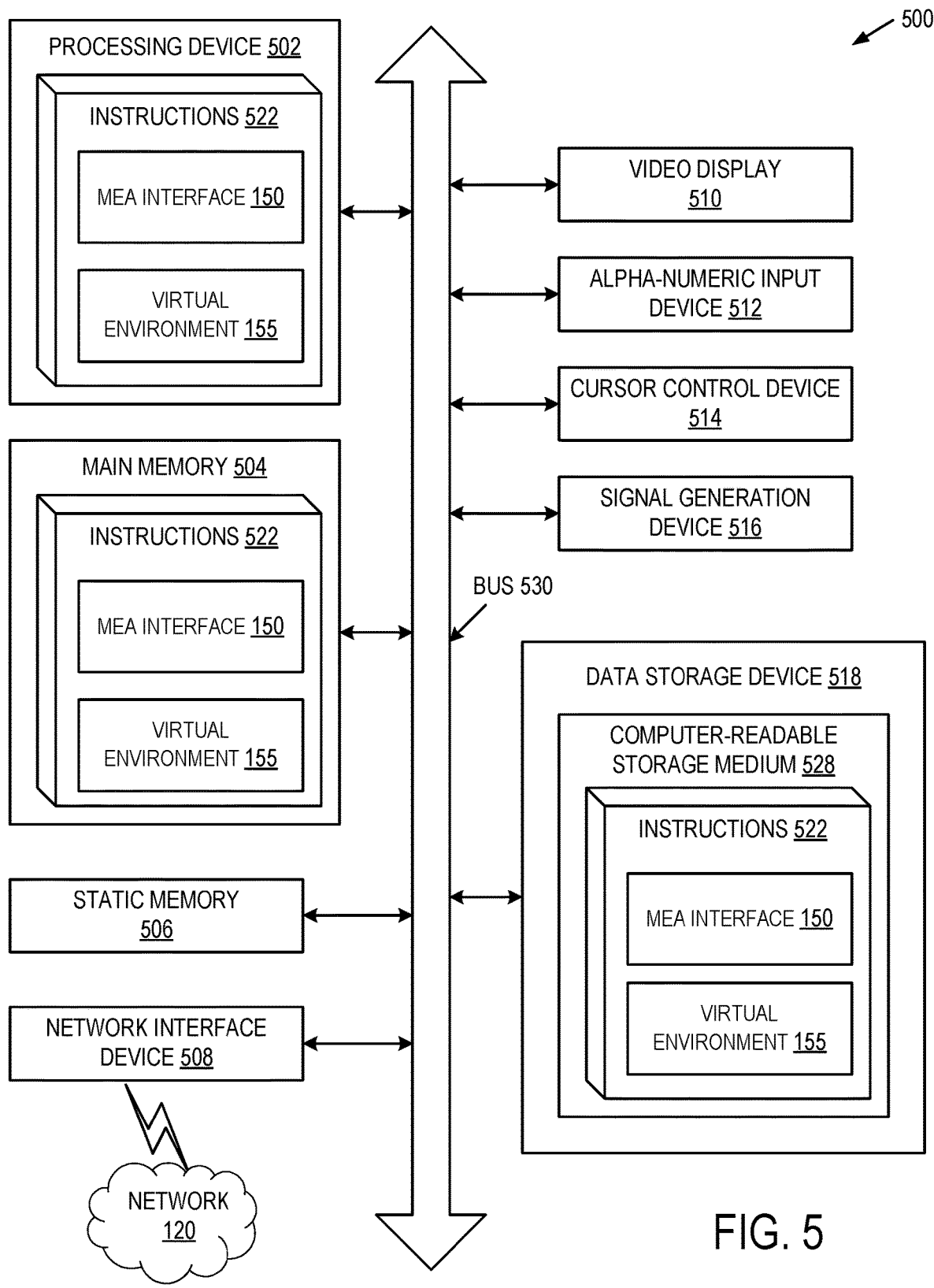
FIG. 5 illustrates an example computing device, in accordance with one embodiment.

FIG. 5 illustrates a diagrammatic representation of a machine in the example form of a computing device 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory (e.g., a data storage device 518), which communicate with each other via a bus 530.

Processing device 502 represents one or more general-purpose processors such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the processing logic (instructions 522) for performing the operations and steps discussed herein.

The computing device 500 may further include a network interface device 508. The computing device 500 also may include a video display 510 (e.g., a liquid crystal display (LCD) or a cathode ray tube (CRT)), an alphanumeric input device 512 (e.g., a keyboard), a cursor control device 514 (e.g., a mouse), and/or a signal generation device 516 (e.g., a speaker).

The data storage device 518 may include a machine-readable storage medium (or more specifically a computer-readable storage medium) 528 on which is stored one or more sets of instructions 522 embodying any one or more of the methodologies or functions described herein. The instructions 522 may also reside, completely or at least partially, within the main memory 504 and/or within the processing device 502 during execution thereof by the computer system 500, the main memory 504 and the processing device 502 also constituting computer-readable storage media.

The computer-readable storage medium 528 may also be used to store MEA interface 150 and/or virtual environment 155 (as described with reference to the preceding figures), and/or a software library containing methods that call MEA interface 150 and/or virtual environment 155. While the computer-readable storage medium 528 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing or encoding a set of instructions for execution by the machine and that cause the machine to perform any one or more of the methodologies described herein. The term "non-transitory computer-readable storage medium" shall accordingly be taken to include, but not be limited to, solid-state memories, and optical and magnetic media.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "converting", "sending", or the like, may refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, and/or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), erasable programmable read only memories (EPROMs), electrically erasable programmable read only memories (EEPROMs), magnetic disk storage media, optical storage media, flash memory devices, other type of machine-accessible storage media, or any type of media suitable for storing electronic instructions, each coupled to a computer system bus.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
receiving a digital input signal from a processing logic;
converting the digital input signal into instructions for a plurality of electrical or optical impulses, where each electrical or optical impulse of the plurality of electrical or optical impulses is associated with a two-dimensional (2D) coordinate;
applying the plurality of electrical or optical impulses at specified coordinates of a 2D grid in a multielectrode array (MEA) in accordance with the instructions, wherein a plurality of biological neurons are disposed on the MEA;
measuring one or more electrical signals output by one or more of the plurality of biological neurons at one or more additional coordinates of the 2D grid;
generating a representation of the one or more electrical signals;
sending a response to the processing logic based on the representation of the one or more electrical signals;
receiving a training signal from the processing logic, wherein the training signal indicates that a target objective of the processing logic was satisfied by the representation of the one or more electrical signals;
determining an electrical or chemical reward stimulus for the plurality of biological neurons; and
outputting the electrical or chemical reward stimulus to the plurality of biological neurons.

2. The method of claim 1, wherein the processing logic comprises a machine learning model.

3. The method of claim 1, wherein the processing logic comprises an application executing on a remote computing device connected to the MEA via a network, wherein receiving the digital input signal comprises receiving the digital input signal over the network, and wherein sending the representation comprising sending the representation over the network.

4. The method of claim 1, wherein the digital input signal comprises a sparse vector generated by the processing logic.

5. The method of claim 1, wherein one or more of the plurality of electrical impulses have at least one of a specified amplitude, a specified current, or a specified frequency.

6. The method of claim 1, wherein the MEA further comprises a protein with bound dopamine, wherein the protein is a photosensitive protein that is sensitive to light of a particular wavelength, and wherein outputting the chemical reward stimulus comprises exposing the MEA to light of the particular wavelength to cause the protein to release the dopamine.

7. The method of claim 1, wherein outputting the electrical reward stimulus comprises applying one or more additional electrical impulses to a plurality of locations on the 2D grid to provide tetanic stimulation to the plurality of biological neurons.

8. The method of claim 1, further comprising:
receiving a second digital input signal from the processing logic;
converting the second digital input signal into second instructions for a second plurality of electrical or optical impulses;
applying the second plurality of electrical or optical impulses at specified coordinates of the 2D grid in the MEA;
measuring one or more additional electrical signals output by one or more of the plurality of biological neurons at one or more further coordinates of the 2D grid;
generating a second representation of the one or more additional electrical signals;
sending the second representation of the one or more additional electrical signals to the processing logic;
receiving a second training signal from the processing logic, wherein the second training signal indicates that the target objective of the processing logic was satisfied by the second representation of the one or more additional electrical signals;
determining an additional electrical or chemical reward stimulus for the plurality of biological neurons, wherein an intensity of the additional electrical or chemical reward stimulus is lower than the intensity of the electrical or chemical reward stimulus; and
outputting the additional electrical or chemical reward stimulus to the plurality of biological neurons.

9. A method comprising:
receiving a digital input signal from a processing logic, wherein the digital input signal comprises a monochrome image comprising a plurality of pixels;
determining a mapping between the plurality of pixels of the monochrome image and a plurality of locations on a two-dimensional (2D) grid;
determining, for each location of the 2D grid, whether that location is to be activated or to be deactivated based on the monochrome image and the mapping;
converting the digital input signal into instructions for a plurality of electrical or optical impulses, where each electrical or optical impulse of the plurality of electrical or optical impulses is associated with a 2D coordinate;
applying the plurality of electrical or optical impulses at specified coordinates of the 2D grid in a multielectrode array (MEA) in accordance with the instructions, wherein a plurality of biological neurons are disposed on the MEA, and wherein the plurality of electrical or optical impulses are applied at locations of the 2D grid that are to be activated;
measuring one or more electrical signals output by one or more of the plurality of biological neurons at one or more additional coordinates of the 2D grid;
generating a representation of the one or more electrical signals; and
sending a response to the processing logic based on the representation of the one or more electrical signals.

10. A biological computing platform comprising:
a multielectrode array (MEA) comprising:
a two-dimensional (2D) grid of excitation sites;
a plurality of biological neurons disposed on the MEA;
a processing device to apply a plurality of electrical or optical impulses at excitation sites having coordinates on the 2D grid of excitation sites; and one or more sensors to measure electrical signals output by one or more of the plurality of biological neurons at coordinates of the 2D grid, wherein the processing device is to receive the electrical signals from the one or more sensors and generate a representation of the electrical signals; and a computing device connected to the MEA, wherein the computing device is to:

receive a digital input signal;

convert the digital input signal into instructions for the plurality of electrical or optical impulses;

send the instructions to the MEA;

receive the representation of the electrical signals from the MEA;

process the representation of the electrical signals;

receive a training signal, wherein the training signal indicates that a target objective of a processing logic was satisfied by the representation of the electrical signals;

determine a electrical reward stimulus for the plurality of biological neurons; and send, to the MEA, an instruction to output the electrical reward stimulus to the plurality of biological neurons.

11. The biological computing platform of claim 10, wherein the MEA is connected to the computing device via a network, and wherein the computing device comprises a web service that is accessible to clients and that enables the clients to access the MEA.

12. The biological computing platform of claim 10, wherein the plurality of biological neurons comprises neurons extracted from one or more rats.

13. The biological computing platform of claim 10, wherein the plurality of biological neurons comprises neurons cultured from one or more stem cells.

14. The biological computing platform of claim 10, wherein the processing device of the MEA is further to:

apply one or more additional electrical impulses to a plurality of locations on the 2D grid to provide tetanic stimulation to the plurality of biological neurons.

15. The biological computing platform of claim 10, wherein the digital input signal comprises a sparse vector generated by an artificial neural network.

16. The biological computing platform of claim 10, wherein one or more of the plurality of electrical impulses have at least one of a specified amplitude, a specified current, or a specified frequency.

17. A biological computing platform comprising:

a multielectrode array (MEA) comprising:

a two-dimensional (2D) grid of excitation sites;

a plurality of biological neurons disposed on the MEA;

a protein with bound dopamine, wherein the protein is a photosensitive protein that is sensitive to light of a particular wavelength;

one or more light sources that emit light at the particular wavelength;

a processing device to apply a plurality of electrical or optical impulses at excitation sites having coordinates on the 2D grid of excitation sites; and one or more sensors to measure electrical signals output by one or more of the plurality of biological neurons at coordinates of the 2D grid, wherein the processing device is to receive the electrical signals from the one or more sensors and generate a representation of the electrical signals; and a computing device connected to the MEA, wherein the computing device is to:

receive a digital input signal;

convert the digital input signal into instructions for the plurality of electrical or optical impulses;

send the instructions to the MEA;

receive the representation of the electrical signals from the MEA;

process the representation of the electrical signals.

18. A biological computing platform comprising:

a multielectrode array (MEA) comprising:

a two-dimensional (2D) grid of excitation sites;

a plurality of biological neurons disposed on the MEA;

a processing device to apply a plurality of electrical or optical impulses at excitation sites having coordinates on the 2D grid of excitation sites; and one or more sensors to measure electrical signals output by one or more of the plurality of biological neurons at coordinates of the 2D grid, wherein the processing device is to receive the electrical signals from the one or more sensors and generate a representation of the electrical signals; and a computing device connected to the MEA, wherein the computing device is to:

receive a digital input signal;

convert the digital input signal into instructions for the plurality of electrical or optical impulses;

send the instructions to the MEA;

receive the representation of the electrical signals from the MEA;

process the representation of the electrical signals;

receive a training signal, wherein the training signal indicates that a target objective of a processing logic was satisfied by the representation of the electrical signals;

determine a chemical reward stimulus for the plurality of biological neurons; and send, to the MEA, an instruction to output the chemical reward stimulus to the plurality of biological neurons; and the processing device of the MEA is further to:

receive the instruction to output the chemical reward stimulus; and activate one or more light sources to expose the MEA to light of a particular wavelength and cause a protein to release the chemical reward stimulus.

19. A biological computing platform comprising:

a multielectrode array (MEA) comprising:

a two-dimensional (2D) grid of excitation sites;

a plurality of biological neurons disposed on the MEA;

a processing device to apply a plurality of electrical or optical impulses at excitation sites having coordinates on the 2D grid of excitation sites; and one or more sensors to measure electrical signals output by one or more of the plurality of biological neurons at coordinates of the 2D grid, wherein the processing device is to receive the electrical signals from the one or more sensors and generate a representation of the electrical signals; and a computing device connected to the MEA, wherein the computing device is to:

receive a digital input signal, wherein the digital input signal comprises an image comprising a plurality of pixels;

determine a mapping between the plurality of pixels of the image and a plurality of locations on the 2D grid;

determine, for each location of the 2D grid, whether that location is to be activated or to be deactivated based on the image and the mapping;

convert the digital input signal into instructions for the plurality of electrical or optical impulses, wherein the plurality of electrical or optical impulses are applied at locations of the 2D grid that are to be activated;

send the instructions to the MEA;

receive the representation of the electrical signals from the MEA; and process the representation of the electrical signals.

* * * * *